(12) United States Patent
Aulbaugh et al.

(10) Patent No.: US 6,226,889 B1
(45) Date of Patent: May 8, 2001

(54) CONTINUOUS ROTARY VACUUM RETORT APPARATUS AND METHOD OF USE

(75) Inventors: Randy A. Aulbaugh, Irving; Gregory G. Hawk, Coppell, both of TX (US)

(73) Assignee: SepraDyne Corporation, Denton, TX (US)

( * ) Notice: Subject to any disclaimer, the term of this patent is extended or adjusted under 35 U.S.C. 154(b) by 0 days.

(21) Appl. No.: 09/521,451

(22) Filed: Mar. 7, 2000

Related U.S. Application Data

(63) Continuation-in-part of application No. 09/272,674, filed on Mar. 19, 1999, now Pat. No. 6,105,275.
(60) Provisional application No. 60/078,554, filed on Mar. 19, 1998.

(51) Int. Cl.[7] ..................................................... F26B 5/04
(52) U.S. Cl. ................................. 34/424; 34/487; 34/516; 34/179; 34/182; 110/229; 110/342; 422/190; 422/228; 422/229; 201/33; 201/35; 202/118
(58) Field of Search .............................. 34/424, 487, 499, 34/516, 138, 139, 140, 141, 179, 182; 110/342, 344, 346, 226, 229, 246; 422/190, 208, 209, 210, 224, 228, 229, 232; 201/33, 35; 202/110, 118, 136

(56) References Cited

U.S. PATENT DOCUMENTS

| | | | |
|---|---|---|---|
| 4,084,521 | 4/1978 | Herbold et al. | 110/242 |
| 4,087,276 | 5/1978 | Generini | 75/81 |
| 4,557,204 | 12/1985 | Faehnle | 110/346 |
| 4,667,609 | 5/1987 | Hardison et al. | 110/236 |
| 5,200,033 | 4/1993 | Weitzman | 159/47.1 |
| 5,242,245 | 9/1993 | Schellsted | 405/128 |
| 5,253,597 | 10/1993 | Swanstrom et al. | 110/346 |
| 5,300,137 | 4/1994 | Weyand et al. | 75/670 |
| 5,330,623 | 7/1994 | Holland | 201/19 |
| 5,517,004 | 5/1996 | Blonk | 219/652 |
| 5,523,060 | * 6/1996 | Hogan | 422/184.1 |
| 5,628,969 | 5/1997 | Aulbaugh et al. | 422/190 |
| 5,746,987 | * 5/1998 | Aulbaugh et al. | 422/190 |

FOREIGN PATENT DOCUMENTS

| | | |
|---|---|---|
| 0884544 | 12/1998 | (EP) . |
| WO 5/06505 | 3/1995 | (WO) . |

\* cited by examiner

*Primary Examiner*—Pamela Wilson
(74) *Attorney, Agent, or Firm*—Locke Liddell & Sapp LLP

(57) ABSTRACT

The present invention relates to a method and apparatus for use in removing at least one volatile contaminant from contaminated material by using a rotary vacuum retort during high temperature and vacuum processing. The loading and unloading are performed in a manner that minimizes the introduction of low boiling point gases. The apparatus employs, in one preferred embodiment, elastomeric pinch valve airlocks to isolate the entire system between the airlocks and a vacuum generator. The apparatus employs, in another preferred embodiment, at least one material transfer element. Furthermore, the contaminated material may be dried in a dryer prior to introduction into the retort. Moreover, the decontaminated material can be cooled through a heat exchanger prior to discharge.

32 Claims, 5 Drawing Sheets

CONTINUOUS ROTARY VACUUM RETORT APPARATUS AND METHOD OF USE

This is a continuation in part application of U.S. patent application Ser. No. 09/272,674 filed Mar. 19, 1999, U.S. Pat. No. 6,105,275 that claims priority to U.S. Provisional Patent Application Ser. No. 60/078,554 filed Mar. 19, 1998.

SPECIFICATION

1. Field of the Invention

The present invention relates to a method and apparatus for use in eliminating or significantly reducing emissions to the atmosphere from retort off-vapor by loading contaminated material into a rotary vacuum retort and continuously unloading one or more volatile contaminants and decontaminated material out of the rotary vacuum retort at high temperature and vacuum while minimizing the introduction of low boiling point gases.

2. Background of the Invention

Various thermal treatment systems have been, and continue to be, used to separate volatile from non-volatile substances. For example, thermal desorption units are commonly used to remove substances such as mercury and volatile organics from solids. The use of vacuum retorts for this purpose is known.

The use of a vacuum decreases the boiling point of volatile substances and decreases the number of molecular collisions per unit of space in time. By minimizing these molecular collisions, chemical reactions and decompositions can be decreased so that vaporization and separation process can be efficiently and productively utilized.

For example, U.S. Pat. No. 5,569,154 (Navetta) discloses an indirectly heated continuous non-rotating vacuum retort with an internal rotating screw feeder. Navetta teaches to load the system at ambient temperature through a rotary airlock or triple dump valve to maintain negative system pressure. An internal hollow screw feeder is used to mix and transport the material being treated through the vessel. Hot gases are passed through the hollow screw feeder to indirectly heat the material being treated within the retort. The hot processed solids exit the opposite end of the screw feeder through a second rotary airlock or triple dump valve to again maintain the negative system pressure. The evolved retort gases diffuse and/or are swept with purge gases into the off-gas treatment system where they are condensed.

Additionally, U.S. Pat. No. 5,433,562 (Swanstrom) discloses an indirectly heated batch non-rotating vacuum retort with an internal screw mixer. Swanstrom teaches to load the retort at ambient pressure and temperature, seal the vessel and internally mix the stationary vessel contents with a screw mixer while indirectly heating the vessel and applying medium to high vacuum. Once the process is complete, the heat is turned off, the vacuum released, and the material removed with a screw feeder at ambient pressure. The evolved retort off-gases diffuse and/or are swept with purge gases into the off-gas treatment system for removal from the gas phase.

These non-rotating systems employ stationary vessels with internal moving flights or screws. Difficulty in uniformly heating the flights and stationary vessel often occurs, leading to metallurgical failures and reduced equipment life. Often, these systems are operated at a lower temperature than the rotary vessel systems to minimize thermal stresses. The rotating retort evenly distributes the indirect heat allowing the use of higher temperatures with less thermal stress.

In addition, the mixing dynamics are different between the non-rotating retort and rotating retort systems. Moreover, particle size reduction is extremely important, especially in ambient and low vacuum systems. In a high vacuum environment, the large pressure gradient between the interior of the particle and the vacuum space drives the volatilization of substances within the particles thereby reducing the need for extensive particle size reduction. The reasons these systems do not employ a rotating retort to overcome these problems is because of the difficulty in maintaining a high vacuum on a hot rotating vessel. The seals on a non-rotating system are simple and straightforward gaskets.

Several prior art systems disclose either heated rotating vessels under slight vacuums of less than 1 inch of mercury or heated non-rotating vessels operated at high vacuums of over 28 inches of mercury. The slight vacuum employed in these rotating systems is to prevent leakage of environmentally-regulated substances out of the retort and off-gas treatment system, while the high vacuum in non-rotating systems serves to shorten process times. Although the technology is well known, there are several drawbacks and limitations.

First, in the prior art low vacuum rotating systems, complex off-gas treatment equipment is required to remove contaminated particulates and regulated chemicals prior to discharge of the treated gases to the atmosphere. This complex off-gas treatment equipment is very large and expensive compared to the system's processing rate. Due to ever more stringent air emission regulations and the need to protect human health and the environment, these off-gas treatment systems continue to become even more sophisticated and costly. One of the primary reasons that the off-gas processing systems associated with these prior art thermal units are so complex and expensive is because of the high volume of contaminated particulates and combustion, sweep, and/or leakage gases exhausted from the retort during operation.

To reduce the size and complexity of the off-gas treatment systems, indirectly fired retort vessels are often used. Heat is applied to the outside of the retort or applied with resistance heaters. These systems reduce the amount of particulates and eliminate the combustion gases exiting the retort. The prior art systems, however, do not entirely eliminate the carry out of particulates from the retort and still require a relatively large amount of sweep gas to move the vaporizing chemicals out of the retort. Therefore, even though an improvement, prior art indirectly fired retorts still require relatively large and expensive off-gas treatment systems.

Additionally, there are many cases in that one or more of the components of the matrix and/or the substances to be separated are thermally sensitive. That is, one or more of the substances break down to unwanted substances and/or the stricture of one or more of the matrix components are altered that adversely affects subsequent treatment or reuse. Prior art systems employing heat and vacuum can be used for these situations. The use of vacuum lowers the boiling point of substances and, depending upon the substances involved, may allow the separation of volatile from non-volatile substances at below critical temperatures.

Additionally, the smaller the particle size, the greater the particle surface area, the faster the processing time, and the better the ultimate removal of the volatile species. The rotating retort is better in reducing particle size during processing and minimizing the production of clinkers compared to non-rotating systems employing internal mixing devices. Steel balls, chains, and similar devices can be added to the rotating retort to further improve particle size reduction capabilities during processing.

Moreover, U.S. Pat. No. 5,628,969 (Aulbaugh) discloses an indirectly heated batch rotary vacuum retort. Aulbaugh teaches to load the retort at rest at ambient pressure and temperature, seal the vessel and rotate the vessel to mix the contents while indirectly heating the vessel and applying medium to high vacuum. Once the process is complete, the heat is turned off, the vacuum released, and the material removed with a screw feeder at ambient pressure. The evolved retort off-gases diffuse into the off-gas treatment system for removal from the gas phase.

In addition, U.S. Pat. No. 5,517,004 (Blonk) discloses an inductively heated continuous rotary vacuum retort operating at below 3 millibar pressure. Blonk teaches to load the retort continuously from one of two vacuum chambers with dry bulk solids. When one chamber is empty, that chamber's discharge valve is closed and the full chamber's valve is opened. The retort vessel rotates to move the solids to the discharge point while heating the solids and applying a vacuum of zero pressure absolute to 3 millibar. The processed solids are continuously discharged at processing temperature into one of two evacuated chambers. When one chamber is full, that chamber's valve is closed and the empty chamber's valve is opened. The evolved retort off-gases are swept into the off-gas treatment system with carrier gases for removal from the gas phase. Blonk teaches a complicated and expensive method for loading dry bulk solids into a vacuum rotary retort and unloading hot processed solids from a rotary vacuum retort while processing at temperature under a very high vacuum. This system requires four stationary vacuum vessels, two for the load end and two for the unload end of the process, does not handle wet materials, must operate at extremely low pressures, and uses swept or purge gases to transport the volatile contaminants out of the retort.

The vacuum systems of the prior art allow or purposefully introduce air and very low boiling point inert purge gases, such as nitrogen, into their systems. Purge gases are often introduced to flush vapors out of the retort and into an off-gas treatment system. These gases, after commingling with the pollutant vapors, are introduced into treatment systems that attempt to separate the pollutant vapors from the gases. Air enters these systems when the vessels are loaded and unloaded and/or enters through the metallic rotary airlock and triple dump valves during processing. All off-gas treatment systems are designed to remove pollutants from a gas stream that will eventually be exhausted to the atmosphere. As the amount of the pollutant in the gas stream decreases, it is increasingly difficult and expensive to continue to remove it.

The vacuum in these prior art systems must be maintained by use of one or more vacuum pumps with a rated cfm capacity higher than the influx rate of the gases. After establishing a vacuum in these prior art systems, if the vacuum pump is turned off, the influx of gases and the production of vapors would soon allow the system pressure to return to ambient conditions. The presence of significant volumes of gases that ultimately pass through the off-gas treatment system acts in many ways to transport pollutants through the off-gas treatment system and dramatically increase the size and complexity of the system designed to reach ever more stringent air pollution control limits. Additionally, these gases impart a large amount of momentum to pollutant vapors and continuously push them through the treatment system as the gases rush in and through treatment system to the exhaust stack.

The consequences of the presence of significant amounts of these gases in the system are staggering. The prior art teaches mass collection for shipment to alternate location for disposal. Off-gas treatment equipment is extremely large, complicated, and costly and pollutants are still continuing to be spewed into the air at rates detrimental to human health and the environment. In addition, the prior art does not attempt to separate the volatile substances collected into different fractions to be collected and recycled. A thermal processing system is needed to overcome the vast limitations of prior art thermal systems by dramatically reducing system costs and complexity and decreasing pollutant emissions to the lowest level practically achievable.

Therefore, a simplified, far more versatile, and economical indirectly heated continuous rotary vacuum retort that minimizes off-gas treatment equipment and produces near zero retort off-vapor emissions is needed to process solids of widely varying particle size, liquid content and shape at higher temperatures and under wider vacuum conditions than currently exists.

Additionally, there exists a need to recover and reuse the resources comprising these off-vapor emissions by collection and separation of the off-vapor emissions into useful and productive components so that the economic value of these otherwise wasted resources can be realized while offering a reduction in emissions to the lowest level practically achievable.

SUMMARY OF THE INVENTION

The present invention is drawn to an apparatus and a method of using the apparatus. In the invention, solid and/or slurried materials to be treated of varying size and liquid content are loaded from an area of ambient pressure into a heated, rotating retort operating under negative pressure or a vacuum. In the preferred embodiment, a combination piston and pinch valve arrangement is used and allows the feeding of wet, sticky, or dry solids that contain objects capable of periodically clogging and causing air leakage in other airlock systems. When closed, the pinch valves can completely seal around solids and the piston shaft to insure the integrity of the system vacuum. The pinch valves are preferably elastomers to avoid the creation of gaps, thereby causing an influx of air and a loss of system vacuum.

By feeding solids or slurried materials to be treated of varying size and liquid content in this manner, the present invention overcomes the difficulties of the prior art and provides a simplified, continuous method of removing and separating volatile substances from non-volatile substances, such as soil.

The preferred embodiment employed herein utilizes elastomeric pinch valve airlocks to isolate the system from the atmosphere and conveying material through the airlocks. Moreover, by using elastomeric seals between the rotating and non-rotating components at the rotating to/from non-rotating junctions, the vacuum loss associated with these interfaces is significantly reduced or eliminated. Furthermore, the inclusion of at least one material transfer device aids in the movement of material. Finally, through the use of a dryer prior to and a heat exchanger after the rotary retort process, heat can be recaptured and reused, the contaminated material or material to be treated can be dried, and the decontaminated material or treated material cooled and efficiently passed through a low temperature airlock arrangement to discharge.

DETAILED DESCRIPTION OF PREFERRED EMBODIMENTS

Gases including, but not limited to, oxygen, nitrogen, and carbon dioxide affect the collection of vapors and similar substances. As used herein, "vapors and similar substances" refer to substances near their condensation temperature at ambient conditions of temperature and pressure. The following preferred apparatus and method of its use separates these vapors and similar substances, also referred to as volatile contaminants, from the material being treated, also referred to as contaminated material, to create decontaminated or treated material wherein the volatile contaminants have been minimized. By initially removing gases, especially very low boiling point gases, prior to treatment in the retort described herein, the apparatus and method of its use efficiently capture virtually all of the vapors and volatile contaminants generated in the retort and dryer. As the contaminated material proceeds through the apparatus and is heated, some volatile contaminants vaporize. The apparatus will draw and collect these vapors from the material being treated for off-vapor treatment.

Figure 1:
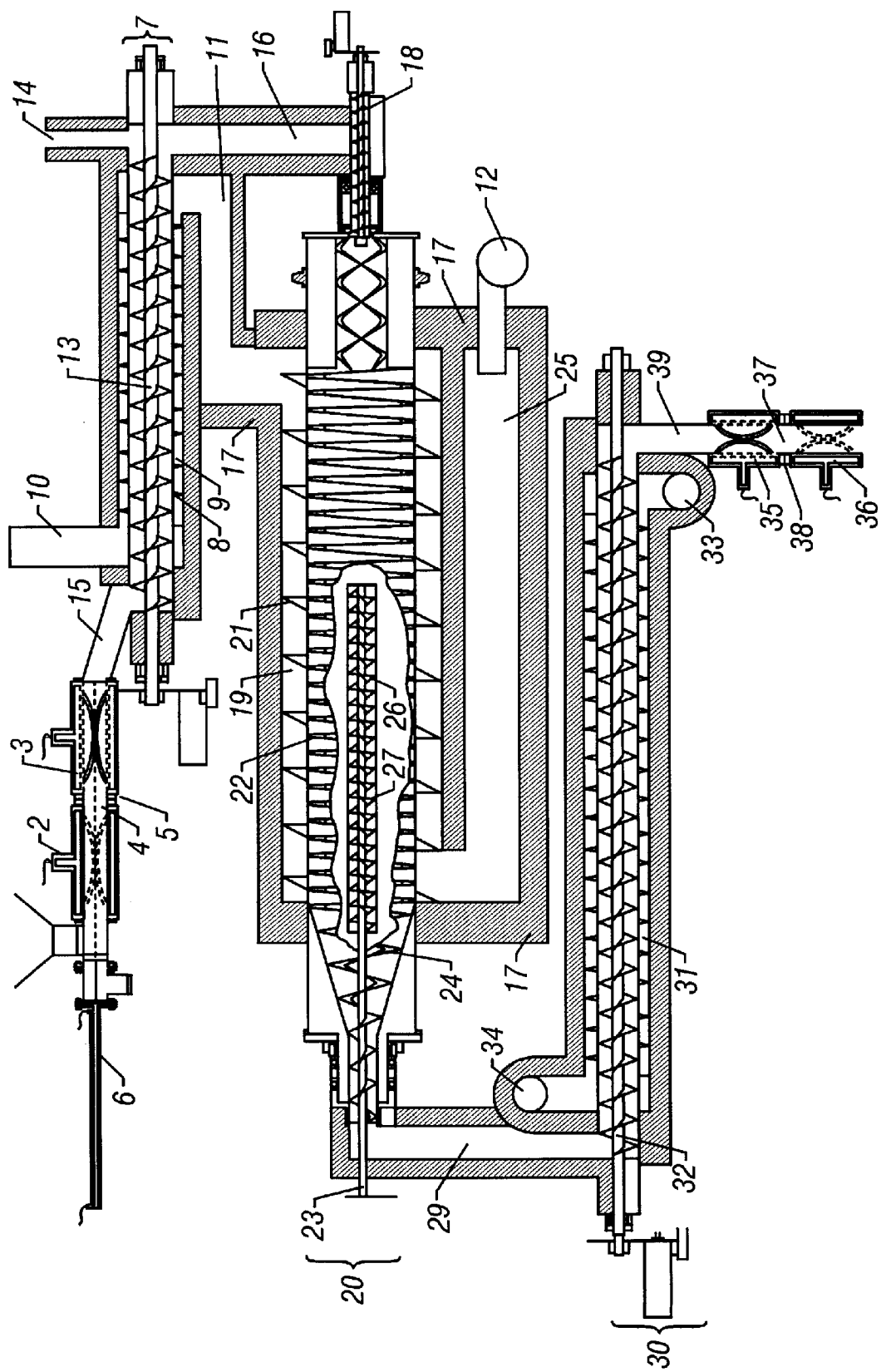
FIG. 1 is a schematic illustrating a preferred embodiment of the invention.

As set forth in FIG. 1, material to be treated is loaded into storage container 1. Piston 6 movably attached to storage container 1 pushes the material to be treated toward airlock 4 preferably comprising a plurality of pinch valves 2 and 3. As depicted in FIG. 1, piston 6 pushes the material to be treated toward pinch valve 2. As the material to be treated approaches pinch valve 2, pinch valve 2 opens to allow the material to be treated and piston 6 to enter airlock compartment 4 area. Once the material to be treated and piston 6 have entered airlock compartment 4, pinch valve 2 is closed. At this point, airlock compartment 4 is evacuated by vacuum port 5. Any device capable of generating a vacuum may evacuate the gases such that the vacuum may preferably approach zero pressure absolute.

A vacuum is pulled in airlock compartment 4 with the ambient temperature gas being exhausted to the atmosphere, passing into its own treatment system, or passing into a dryer and/or retort off-gas treatment system. Ideally, storage container 1 can be filled such that piston 6 will push and nearly fill airlock compartment 4 with material to be treated, thus eliminating or at least significantly reducing the amount of ambient temperature vapors or gasses to be removed.

Moreover, pinch valves 2 and 3 located at the beginning of this process and a plurality of pinch valves 35 and 36 that will be discussed in more detail herein are most preferably elastomeric pinch valves. Rubber, Viton®, or similar components are especially acceptable to provide the efficient protection of the reduced pressure environment demonstrated herein. Moreover, though metal valves may prove to be less efficient in this configuration, their use should be evident to those skilled in the art. The usage of non-elastomeric pinch valves merely requires additional maintenance of the vacuum and the associated treatment of gases contained therein.

Returning to the process, once the material to be treated has been collected within airlock compartment 4, pinch valve 2 has been sealed, and the pressure has been reduced through vacuum port 5, if necessary, pinch valve 3 is opened and piston 6 pushes the material to be treated such that it may move down airlock 4 to dryer pathway 15 and enter dryer 7.

A dryer screw feeder 13 comprising a spiral thread is used in the most preferred embodiment to convey the material being treated through dryer 7. As dryer screw feeder 13 rotates, the material being treated moves through dryer 7. As material being treated moves, hot gases passing from dryer gas pathway 11 spiral about dryer spiral gas pathway 9 formed by the dryer fin spiral arrangement 8 arranged about the exterior of dryer 7 and within insulated firebox 17. The dryer spiral arrangement 8 comprises a continuous barrier that approaches the firebox 17 such that gases are encouraged to travel about dryer 7 in a spiraled fashion. This arrangement effectively lengthens the path about dryer 7 and allows more of the heat within the gases to transfer to dryer 7. Hot gases from retort dryer gas pathway 11 spirally traverse dryer spiral gas pathway 9 and exit through exhaust port 10. As the material being treated moves through dryer 7, heat is transferred from the hot gases passing about the exterior of dryer 7 into the material being treated. Moreover, the spiraling hot gases create a temperature gradient along dryer 7 and rotary retort 20. This temperature gradient allows the selective separation and collection of substances with progressively higher boiling points along the length of rotary retort 20 as described below and shown in a preferred embodiment and method of use in FIG. 2.

As the material being treated moves through the full extent of dryer 7, dryer screw feeder 13 displaces the material being treated such that it falls through dryer retort pathway 16. In the preferred embodiment, vapor discharge pipe 14 allows water vapor and low boiling point substances to be removed from the system and treated, if desired.

A retort screw feeder 24 axially rotates and effectively displaces the material being treated in a similar fashion as dryer screw feeder 13. As the material being treated enters rotary retort 20 it is ushered forward to rotary retort spiral flighting 22 formed about the interior of rotary retort 20. Hot off-gases are directed about rotary retort 20 along rotary retort spiral gas pathway 19 that is defined by a series of rotary retort fins 21 formed in the exterior of rotary retort 20 and firebox 17. In a similar fashion as with dryer 7, rotary retort 20 is heated by these gases. This configuration uses the same gases to heat both rotary retort 20 and dryer 7.

Additionally, the creation of a temperature gradient along the axis of dryer 7 and/or rotary retort 20 not only maximizes the contact of the hot combustion gases passing through pathways 9, 11, 19, and 25, but allows the selective volatilization of substances with different boiling points. Though many methods of providing the preferable temperature gradient will be evident to those skilled in the art, including, but not limited to wrapping the vessels in electrical resistance tape, heating the vessels by electrical induction, and subjecting the vessels to heated or super heated steam, the preferred embodiment utilizes burner 12 to heat the gases that are spirally propelled about dryer 7 and rotary retort 20 within firebox 17.

As the material being treated moves through rotary retort 20 and interacts with spiral flighting 22, vapors separate from the material being treated. Transfer pipe 23 extends within the rotary retort and provides a preferred location for maintaining the vacuum or reduced pressure on the overall system by using vacuum generator 28 shown in FIG. 3 or similar pressure reducing device. Additionally, transfer pipe 23 provides a conduit for drawing the vapors from the material being treated during the separation process. In the preferred embodiment and method of use, vacuum generator 28 maintains between 2.25 mm Hg and 735 mm Hg pressure. A condensable vapor can be bled into retort 7 at port 27. By issuing a small, constant amount of condensable vapor, preferably steam, at this point, the substances volatizing from the material being treated will be ushered along into transfer pipe 23. This bleeding of condensable vapor effectively creates a condensable vapor shield that minimizes substances volatizing from the material being treated from traveling down retort to heat exchanger pathway 29 and reassociating with the treated material as it is cooled in heat exchanger 30.

Figure 2:
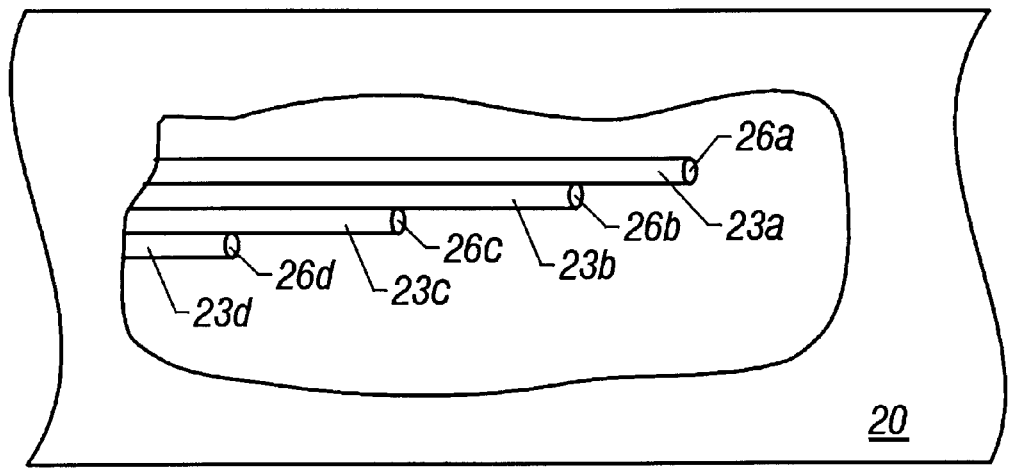
FIG. 2 is a cut away close-up of a preferred embodiment of the vapor transfer pipes.

Referring to FIG. 2, a bundle of transfer pipes 23a, 23b, 23c, and 23d with variable entrances 26a, 26b, 26c, and 26d, respectively, can be longitudinally positioned within rotary retort 20 such that the temperature gradient caused by the heat transferred from the hot gases spiraling about the exterior of rotary retort 20 allow substances with different boiling points to vaporize at different points along the length of rotary retort 20. As shown, a substance with a relatively low boiling point will vaporize earlier from the material being treated as it traverses rotary retort 20. This vapor would be drawn into the entrance 26a of transfer pipe 23a while a substance with a higher boiling point would vaporize farther along rotary retort 20 and be drawn into entrance 26d of transfer pipe 23d, for example. This selective capture of vapors with increasing boiling points insures that low boiling point substances are not exposed to higher temperatures that could provide sufficient thermal energy to break chemical bonds.

Figure 3:
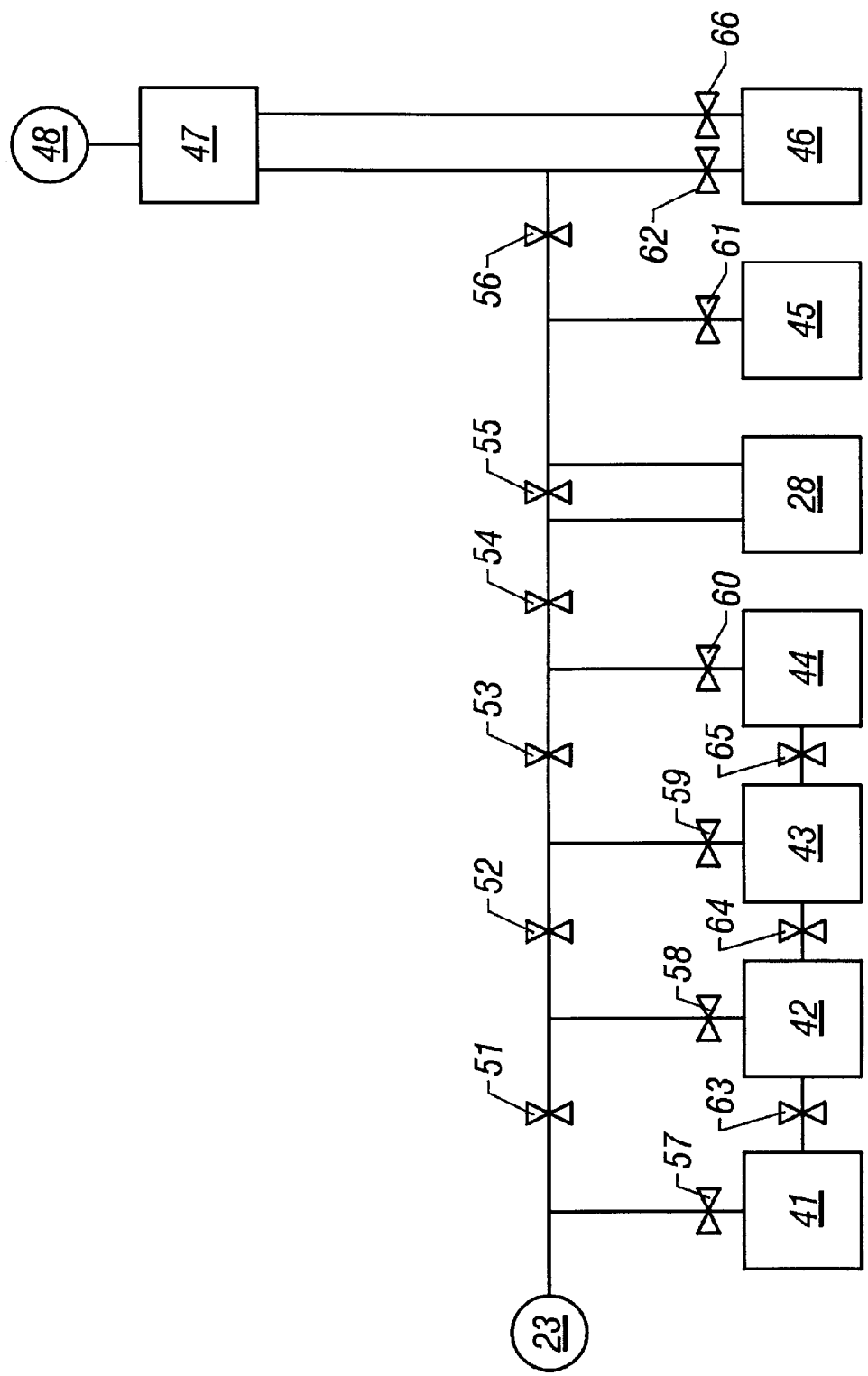
FIG. 3 is a flow chart of a preferred embodiment of the off-vapor treatment system.

Referring to FIG. 3, transfer pipe 23 may lead to an off-vapor treatment system that may comprise a plurality of impingers, condensers, and similar devices known to those skilled in the art. In the most preferred embodiment, it is envisioned that one or more condensers operating at different temperatures can be helpful in selectively separating vapors and gases collected. Additionally, the use of impinger solutions with different chemistries, such as aqueous solutions of different pH levels and organic solutions with different polarities, may also be helpful. Moreover, the present invention may be used in conjunction with adsorbents and molecular sieves to provide further separation and classification.

Additionally, the vacuum generator 28, capable of maintaining the vacuum on the system, is in communication with transfer pipe 23, normally via at least one separator as depicted in FIG. 3. The use of a vapor compression device in conjunction with the vacuum generator 28 is envisioned to allow the pressurization of the vapors being collected from the system. Moreover, the use of cryogenic cooling at this point allows the condensation of substances that remain after the interaction with the impingers, condensers, and similar devices and may be passed onto a vapor compression unit. Effectively, pollutant emissions are reduced to near zero by virtually eliminating the amount of oxygen, nitrogen, carbon dioxide, and similar gases from the system, and condensing all vapors in the off-vapor treatment system. Similarly, the vacuum or pressure reduction occurring in airlocks 5 and 37 may collect trace vapors or gases that may be treated similarly. In the preferred method of use, however, these gases are treated separately from the vapors drawn from the material being treated in the dryer 7 and rotary retort 20.

As shown in a preferred embodiment of the off-vapor treatment system in FIG. 3, at least one separator 41, 42, 43, or 44 is in communication with transfer pipe 23 and vacuum generator 28. Those skilled in the art will recognize that any plurality of separator can effectuate this system. As shown, a plurality of separators 41, 42, 43, and 44 are arranged to effect separations of the vapors into different groups based upon properties including, but not limited to, solubility in organic and aqueous solutions of different pH levels and polarity, boiling points, condensation points, and ionic strength. Other chemical and physical property differences that could be used as a basis for separation are evident to those skilled in the art. Preferably, the arrangement of separators 41, 42, 43, and 44 economically separates various volatile substances that have been drawn from the material being treated. In practice, the fractional distillation treatment method used by petrochemical plants to produce various boiling point range condensates from crude oil is but one representative example of the separation technology that may be drawn upon in adapting, reconfiguring, or otherwise substituting components in this system.

In the arrangement depicted in FIG. 3, numerous pipes or similar conduits interlink any and all components either directly or indirectly. Some of these pipes further comprise valves 51, 52, 53, 54, 55, 56, 57, 58, 59, 60, 61, 62, 63, 64, 65, and 66 to limit or stop flow therethrough. As vapors enter transfer pipe 23, the vapors will travel to valve 51. Vapors drawn from rotary retort 20 via transfer pipe 23 with specific chemical properties will be retained at one separator 41, 42, 43, or 44 while the remaining vapors will continue. As depicted, separator 41 is a condenser operated at 350° C. The majority of vapors entering separator 41 with boiling points above 350° C. will condense to liquid while lower boiling point substances will pass through as vapors.

A plurality of valves 51, 52, 53, 54, 55, 56, 57, 58, 59, 60, 61, 62, 63, 64, 65, and 66 afford a large degree of flexibility to route vapors to any series of separators 41, 42, 43, and/or 44 as desired. Separators 41, 42, 43, and 44 represent any number and combination of impingers, condensers, molecular sieves, ion exchange columns, precipitation chambers, reactors, or any of a number of other commercially available vapor and liquid separators known to those skilled in the art.

Though vacuum generator 28, ultimately in communication with and drawing vapors from the rotary retort 20 via transfer pipe 23, may reduce the pressure to nearly zero pressure absolute, the preferred embodiment and method of use of vacuum generator 28 maintains between 2.25 mm Hg and 735 mm Hg vacuum in all of the apparatus including rotary retort 20, dryer 7, if present, heat exchanger 30, if present, this off-vapor treatment system, and any and all connectors that interlink these components. Though the off-vapor treatment system comprises separators on the vacuum side of the vacuum generator, separators may also be in communication with the system on the outlet or pressure side of the vacuum generator.

Vapor compressors 45 and 46 can be operated at different levels of compression and temperature. In fact, in an optimum vapor treatment system, all vapors could be passed through a series of vapor compressors operating at gradually increasing pressures and gradually decreasing temperatures to sequentially condense and separate the vapors into fairly small boiling point range fractions. If high enough pressure and low enough temperatures are used, and the combined vapor and gas volume is very small, even the nitrogen and oxygen can be condensed to liquid. However, attempting to approach the condensation conditions for nitrogen and oxygen will most likely cause all organic substances to condense or solidify. Finally, adsorbents 47, preferably activated carbon, are typically inserted as a final safeguard to insure that only atmospheric gases, if present, pass through to the atmosphere 48.

This treatment system can be substituted, reconfigured, or otherwise replaced or rearranged except that any vapor compressor, 45 and 46 herein, must be in communication with the system on the "pressure side" or outlet of vacuum generator 28. As depicted in this embodiment, separator 41 comprises an aqueous impinger, separator 42 comprises an organic impinger, and separator 43 comprises an ice water condenser. Vapor compressors 45 and 46 arc vapor condensers operated at different temperatures and pressure and are preferably used in series.

Moreover, the employment of multiple transfer pipes 23a, 23b, 23c, and/or 23d, as depicted in FIG. 2 and discussed herein, can be used in conjunction with this system or similar separation arrangements. In fact, employing a plurality of staggered length transfer pipes 23a, 23b, 23c, and/or 23d to selectively draw vapors at different points along rotary retort 20 may help decrease the number of separations, thus requiring less separators, that must be performed.

As the treated material moves through the end of rotary retort 20, now unburdened with the volatile substances that have been removed by rotary retort 20, the treated material passes down retort to heat exchanger pathway 29. As the treated material enters heat exchanger 30, preferably a cooling means known to those skilled in the art such as a heat exchanger screw feeder 32 that rotates and moves the treated material along the length of heat exchanger 30. The outer exterior of heat exchanger 30 comprises heat exchanger spiral gas pathway 31 similar to spiral gas pathways 9 and 19 depicted around dryer 7 and rotary retort 20. Cooler gases, preferably air from heat exchanger gas entrance 33 enter and travel about heat exchanger spiral gas pathway 31 and exit through heat exchanger gas exit 34 and the hot air goes to burner 12. In the alternative, heat exchanger 30 may employ a cold water jacket or similar heat exchange means known to those skilled in the art to aid in the cooling of the treated material.

Heat contained within the treated material transfers from the treated material to the gases traveling about heat exchanger 30. By effectively cooling the treated material in this fashion, the treated material will be sufficiently cool at the end of heat exchanger 30 to allow the use of elastomeric pinch valves 35 and 36 like the ones depicted as pinch valves 2 and 3. Pinch valves 35 and 36 forming second airlock chamber 37 are preferably elastomeric pinch valves, thus requiring cooling of treated materials by heat exchanger 30 and/or supplemental cooling of the pinch valves 35 and 36. The vacuum may be maintained by a vacuum generator or similar pressure reducer, in communication with the vacuum port 38, that preferably further comprises a particulate filter on its pressure or output side. Though many particulate filters are known in the art, a high efficiency particulate air filter (HEPA) is preferred.

By using alternative pinch valves, the use of heat exchanger 30 may not be necessary. For example, the use of metal valves in the place of pinch valves 35 and 36 may withstand higher heat. In the preferred embodiment, however, by cooling the treated material with heat exchanger 30, elastomeric pinch valves 35 and 36 can provide a more efficient seal and thus reduce the influx of air and more efficiently maintain the reduced pressure environment of the system as depicted in FIG. 1. Heat exchanger 30 also recovers the heat from the treated material. Moreover, the present invention and its method of use may include the introduction of water or similar cooling substances to cool the treated material prior to interaction with the airlock, most preferably elastomeric pinch valves. A cool water jacket or similar heat exchange means surrounding the pinch valve can be used to lower the temperature of the pinch valves sufficiently to permit the use of elastomeric pinch valves. The same technology can be used to lower the temperature of the seals at the interfaces of the rotating and non-rotating components to permit the use of elastomeric seals.

As the treated material is ushered along the length of heat exchanger 30, preferably by a rotary heat exchanger, the treated material drops from heat exchanger 30 to exit airlock pathway 39 and collects above pinch valve 35. Prior to opening pinch valve 35 to allow the treated material to collect within airlock compartment 37, vacuum as low as zero pressure absolute is drawn on airlock 37. The gases withdrawn from airlock 37 are typically filtered, preferably with the high efficiency particulate air filter previously discussed, before being expelled into the atmosphere. Once airlock 37 is evacuated of gases, pinch valve 35 is opened and airlock 37 is filled with falling, treated material. Pinch valve 35 closes and pinch valve 36 may be opened to allow the treated material to exit from the system.

Returning to the gas pathways, the now heated air exiting heat exchanger gas exit 34 may be heated and directed to burner 12. Additionally, numerous other methods of heating and cooling the treated material to produce the same results will be evident to those skilled in the art such as spraying cool water on the treated material to cool and rehydrate the treated material.

Though the preferred method and embodiment comprise the use of dryer 7 and heater exchanger 30, these components are optional. Moreover, the addition of components to aid in the separation and collection process, for example the use of heat insulating tape about transfer pipe 23 to insure vapors remain in the vapor phase until off-vapor treatment and collection is possible, fall well within the scope of providing a continuous process for the removal of volatile from nonvolatile substances as depicted herein. Additionally by example, the altering of the chemical composition of the material to be treated with chemical additives may enhance the efficiency of the system by changing the chemical properties of one or more substances leading to more efficient capture and separation. By providing a system that offers versatility and compactness, the present invention provides the method and apparatus capable of significantly reducing processing costs and capturing virtually all of the emissions of substances of concern.

Figure 4:
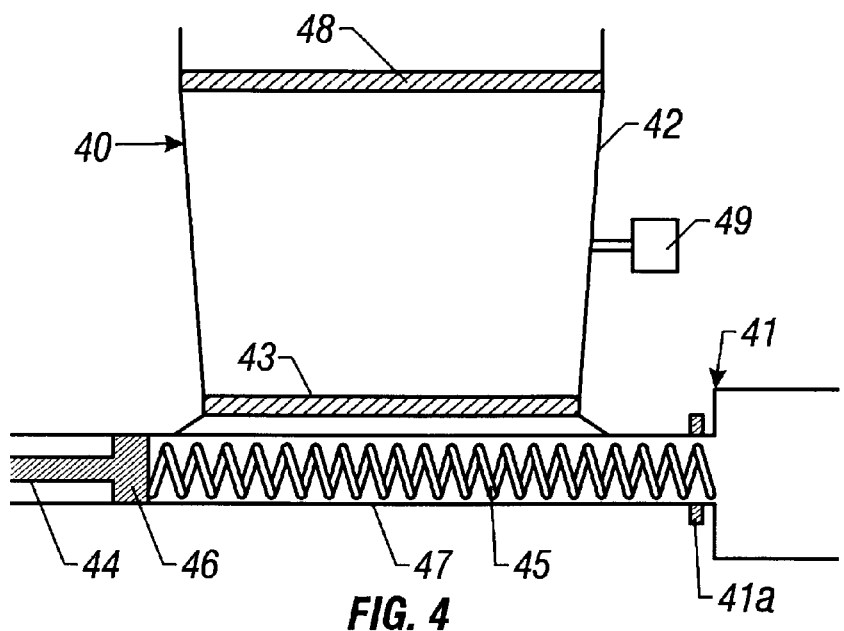
FIG. 4 is a side view of an alternative embodiment of an airlock to be used in the present invention.

An example of the alternatives that are within the scope of the invention is an alternative configuration for at least one airlock. For example as shown in FIG. 4, an airlock 40 is included in the front end 41 of either a continuous rotary retort apparatus or a dryer or similar heat exchanger disposed before the retort. During processing, the vacuum hopper 42 includes valve 43 such as a slide gate inserted or otherwise disposed such that a vacuum tight piston 44 may be isolated from the rest of the hopper 42. In FIG. 4, piston 44 is in a retracted position as compared to the extended position as shown in FIG. 5.

Piston 44 pushes an auger 45 or similar material transfer device known to those skilled in the art at least partially into the front end 41, which may be a dryer or a retort, such that the piston head 46 may at least partially clear the valve 43 capable of isolating the vacuum hopper 42 from the auger assembly 45. As shown, front end 41 may include an interface with wall 47 such as a ring seal 41a or similar junction between rotating and non-rotating components of the present invention. When in the position shown in FIG. 5, the piston head 46 and a second piston head 50 form vacuum tight seals to the wall 47 such that virtually no air may escape into the front end 41. It is envisioned that this function may be improved by incorporating at least one inflatable head piston in either or both of these piston heads to help maintain the seal by producing a vacuum tight seal with the wall 47.

Figure 6:
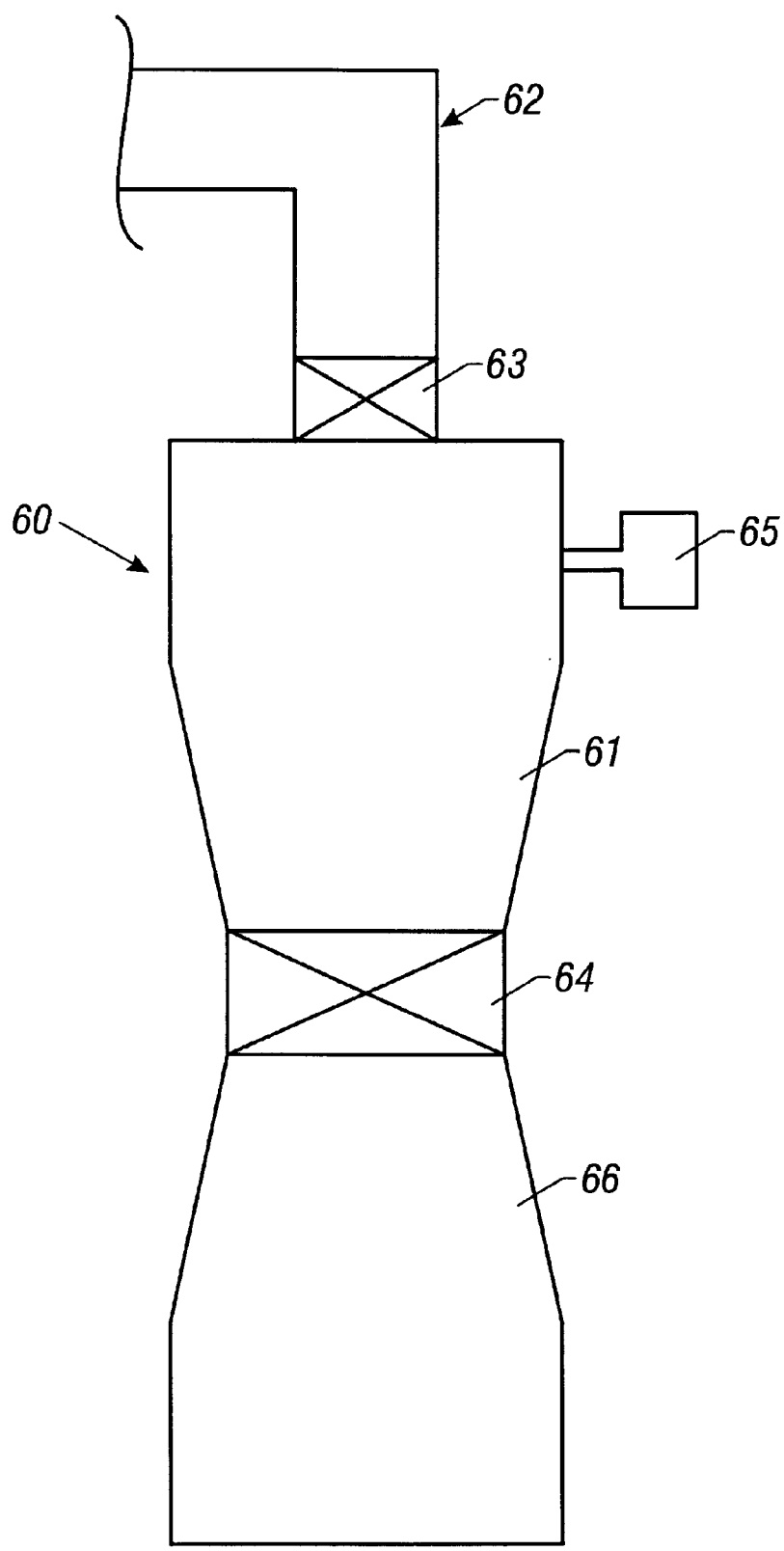
FIG. 6 is a side view of an alternative embodiment of an airlock to be used in the present invention.

Similarly, it is envisioned that a similar airlock may be configured after the retort. As shown in FIG. 6, an airlock 60 is formed in hopper 61. At the top of hopper 61, nearest the end 62 of cooler or retort, a valve 63, such as a vacuum tight valve, may seal the system from the introduction of ambient pressure into the end 62 of the retort or cooler. A second valve 64, such as a vacuum tight valve, is secured or otherwise disposed at the bottom of hopper 61 to form airlock 60. A vacuum pump 65 may be in communication with airlock 60 to maintain the pressure level of the system. In operation, materials being emptied from the end 62 will fall through an open valve 63 and fall into hopper 61, collecting upon closed valve 64. As hopper 61 is nearly full, valve 63 will be closed and valve 64 will be opened, allowing the materials to fall into an ambient pressure storage container 66 disposed below the hopper 61. Once hopper 61 has emptied, valve 64 is closed, vacuum pump 65 evacuate the air that has entered airlock 60, and valve 63 may be reopened without introducing ambient pressure into the system.

Figure 5:
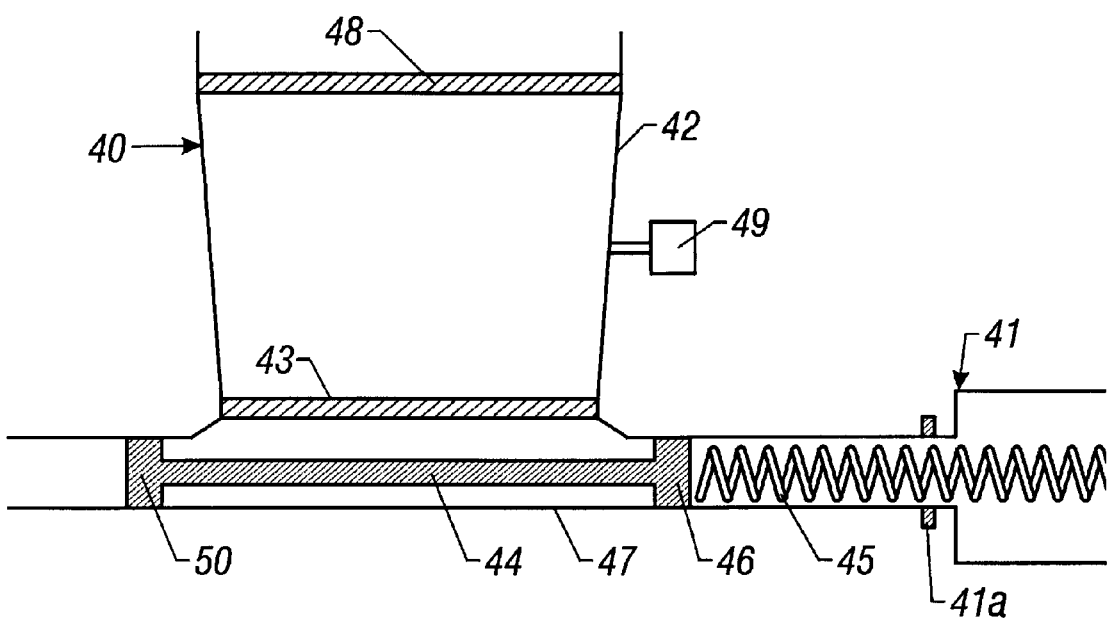
FIG. 5 is a side view of an alternative embodiment of an airlock to be used in the present invention.

Referring to FIGS. 4 and 5, in a preferred method of using airlock 40, the vacuum hopper 42 may be brought to atmospheric pressure by at least partially opening a vacuum tight valve 48 secured or otherwise disposed on the top of the hopper 42. In use, the hopper 42 is unsealed as described and may be rapidly filled. Once the vacuum hopper 42 is filled, the vacuum tight valve 48 at the top of the hopper 42 is closed and the air removed with a vacuum pump 49 as described herein until the pressure within the vacuum hopper 42 approximates that of the processing system. The vacuum tight piston 44 is retracted to its original position, pulling the auger 47 back out of the front end 41, and into its home position. The valve 43 may be opened and the auger 47 begins to feed the waste into the front end 41 of the dryer or retort. This process is repeated when the vacuum hopper 42 is empty. This configuration creates an airlock 40 that can periodically be partitioned or isolated into at least two areas in which different pressures can be established.

Figure 7:
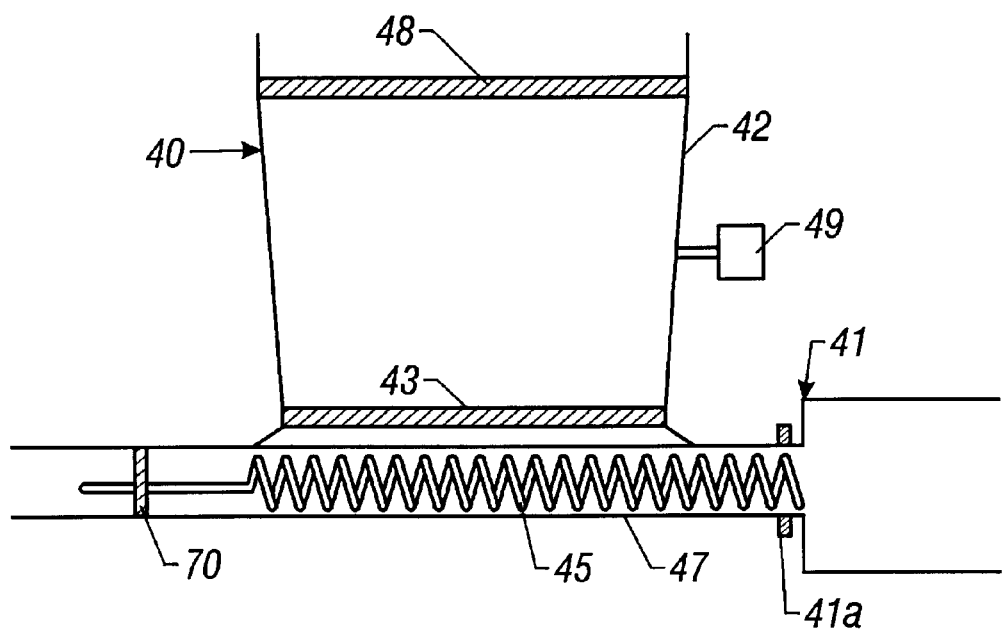
FIG. 7 is a side view of an alternative embodiment of an airlock to be used in the present invention.

An alternative embodiment for airlock 40 is shown in FIG. 7. This airlock 40 may be included in the front end 41 or rear end (not shown) of the continuous rotary retort apparatus. As described herein, the inclusion of a ring seal 41 a or similar seal at the junction of the rotating and non-rotating components of the present invention is preferable. During processing, the vacuum hopper 42 includes valve 43 such as a pinch valve inserted or otherwise disposed such that a material transfer device such as a worm pump, conveyor, auger, screw feeder, or similar device known to those skilled in the art may operate below valve 43. This configuration allows this material transfer device to be isolated from the hopper 42 prior to opening valve 48 to receive additional material to be treated. Those skilled in the art will recognize that material transfer device 45 may be driven, turned, or otherwise activated by any motor, engine, or similar activating device that may be attached, secured, otherwise place in mechanical communication with material transfer device 45. The connection point 70 should be sealed or otherwise isolated to insure that the pressure integrity of the system is maintained. Plugs, seals, or similar devices may be in vacuum tight communication with the wall 47 at point 70 to aid in maintaining this integrity.

Material transfer device 45 may be configured to translate into front end 41 (or rear end) to aid in the movement of material to be treated or the removal of treated material if included at the rear end (not shown). As previously discussed, an airlock of this configuration benefits from a vacuum generator 49 to help maintain the pressure of the system in airlock 40. Though described with relation to transferring material to be treated, this device is equally useful on material that has been treated and is being removed from the system.

Though this disclosure describes the preferred embodiment and its method of use, it will be evident to those skilled in the art that many modifications in the above-described preferred embodiment of the apparatus and method of its use may be incorporated to provide a system and method of use within the scope and vision of inventive concepts herein.

What is claimed is:

1. A method of separating at least one volatile contaminant from a contaminated material within a rotary retort, wherein the retort has an entrance, an exit, and a pair of rotating to or from non-rotating junctions, the method comprising the steps of:
    (a) continuously moving contaminated material from a first airlock in communication with the entrance to the rotary retort;
    (b) applying a vacuum of between about 2.25 mm Hg and about 735 mm Hg to the contaminated material;
    (c) applying heat to the contaminated material to render the internal temperature within the rotary retort greater than ambient temperature and sufficient to volatize at least one contaminant;
    (d) removing the volatized contaminant from the rotary retort; and
    (e) moving the decontaminated material through a second airlock in communication with the exit.

2. The method of claim 1 wherein step (a) is accomplished by using at least one material transfer element.

3. The method of claim 1 wherein step (e) is accomplished by using at least one material transfer element.

4. The method of claim 1 wherein the vacuum in the rotary retort is maintained at a pressure sufficient to remove at least one volatile contaminant.

5. The method of claim 1 wherein the material transfer element is an auger.

6. The method of claim 1 wherein the material transfer element is a piston.

7. The method of claim 1 which further comprises evacuating the second airlock before opening the second airlock to the exit.

8. The method of claim 1 further comprising drying the contaminated material by using a dryer disposed between the first airlock and the entrance.

9. The method of claim 1 further comprising cooling the decontaminated material exiting the exit by using a heat exchanger disposed between the exit and the second airlock.

10. The method of claim 1 wherein the volatized comaninant is removed from the retort by a plurality of transfer pipes wherein each transfer pipe terminates at a different distance within the rotary retort.

11. A chemical processing and reaction apparatus for continuously extracting at least one volatile contaminant from a contaminated substance comprising:
- a rotary retort, having an entrance and an exit, adapted to rotate about a central axis;
- at least two airlocks in communication with the rotary retort, including a first airlock disposed before the entrance and a second airlock disposed after the exit;
- a vacuum generator in communication with the rotary retort capable of maintaining a vacuum of between about 2.25 mm Hg and 735 mm Hg within the apparatus; and
- a heater in communication with the rotary retort adapted to heat the contaminated material in the rotary retort to a temperature sufficient to volatilize at least one volatile contaminant.

12. The apparatus of claim 11 further comprising at least one material transfer element disposed before the entrance.

13. The apparatus of claim 11 further comprising at least one material transfer element disposed after the exit.

14. The apparatus of claim 11 further comprising at least one dryer disposed between the first airlock and the entrance.

15. The apparatus of claim 11 further comprising at least one a heat exchanger disposed between the second airlock and the exit.

16. The apparatus of claim 11 further comprising a plurality of transfer pipes wherein each transfer pipe terminates at a different distance within the rotary retort.

17. The apparatus of claim 12 wherein the material transfer element is a worm pump.

18. The apparatus of claim 11 wherein the first airlock comprises a vacuum tight valve.

19. A method for minimizing the amount of atmospheric gasses being delivered to an off vapor treatment system from a rotary retort that separates at least one volatile contaminant from a contaminated material disposed within the rotary retort, wherein the rotary retort has an entrance and an exit, the method which comprises the steps of:
  (a) loading contaminated material in a first airlock in communication with the entrance;
  (b) evacuating the first airlock;
  (c) moving contaminated material through the first airlock into the retort;
  (d) applying a vacuum of between about 2.25 mm Hg and 735 mm Hg to the contaminated material in the rotary retort;
  (e) applying heat to the contaminated material to render the internal temperature within the rotary retort greater than ambient temperature and sufficient to volatize at least one contaminant;
  (f) removing each volatized contaminant from the retort and sending the contaminant to the off vapor treatment system;
  (g) moving the decontaminated material through a second airlock in communication with the exit.

20. The method of claim 19 wherein the first airlock is evacuated at a pressure sufficient to removes at least one atmospheric gas.

21. The method of claim 19 which further comprises evacuating the second airlock such that at least one atmospheric gas is evacuated after step (g).

22. The method of claim 19 which further comprises drying the contaminated material by using a dryer disposed between the first airlock and the entrance.

23. The method of claim 19 which further comprises cooling the decontaminated material exiting the exit by using a heat exchanger disposed between the exit and the second airlock.

24. An apparatus that mininimizes the introduction of at least one atmospheric gas into an off vapor treatment system comprising:
- a rotary retort, having an entrance and an exit, adapted to rotate about a central axis;
- at least two airlocks, including a first airlock disposed before the entrance and a second airlock disposed after the exit, wherein the airlocks minimize the entry of atmospheric gas;
- a vacuum generator in communication with the rotary retort capable of maintaining a vacuum of between about 2.25 mm Hg and 735 mm Hg within the apparatus;
- a heater in communication with the rotary retort adapted to heat contaminated material disposed within the rotary retort to a temperature sufficient to separate at least one volatile contaminant from the contaminated material; and
- at least one transfer pipe at least partially disposed within the rotary retort and in communication with the off-vapor treatment system.

25. The apparatus of claim 24 further comprising at least one dryer disposed between the first airlock and the entrance.

26. The apparatus of claim 24 further comprising at least one a heat exchanger disposed between the second airlock and the exit.

27. A method of separating at least one volatile contaminant from a contaminated material disposed within a rotary retort having an entrance, an exit, and a pair of rotating to or from non-rotating junctions, the method comprising the steps of:
  (a) moving the contaminated material from a first airlock in communication with the entrance;
  (b) applying a vacuum of between about 2.25 mm Hg and 735 mm Hg to the contaminated material in the rotary retort;
  (c) applying heat to the contaminated material to render the internal temperature within the rotary retort greater than ambient temperature and sufficient to volatize at least one contaminant;
  (d) removing each volatized contaminant from the rotary retort; and
  (e) moving the decontaminated material through a second airlock in communication with the exit.

28. The method of claim 27 wherein the first airlock is maintained at pressure approximating that within the rotary retort.

29. The method of claim 27 wherein the second airlock is maintained at pressure approximating that within the rotary retort.

30. The method of claim 27 wherein step (a) is accomplished by using a material transfer element.

31. The method of claim 27 wherein step (e) is accomplished by using a material transfer element.

32. The method of claim 27 wherein steps (a)–(e) may be continuously performed.

* * * * *